(12) United States Patent
MacEachern et al.

(10) Patent No.: US 6,848,017 B2
(45) Date of Patent: Jan. 25, 2005

(54) METHOD AND APPARATUS FOR DETERMINING CONNECTIONS IN A CROSSBAR SWITCH

(75) Inventors: Stuart P. MacEachern, Hopkinton, MA (US); Jacob Y. Bast, Framingham, MA (US); Raju C. Bopardikar, Carlisle, MA (US); Jack J. Stiffler, Marion, MA (US)

(73) Assignee: EMC Corporation, Hopkinton, MA (US)

(*) Notice: Subject to any disclaimer, the term of this patent is extended or adjusted under 35 U.S.C. 154(b) by 643 days.

(21) Appl. No.: 10/032,825

(22) Filed: Oct. 24, 2001

(65) Prior Publication Data

US 2002/0181449 A1 Dec. 5, 2002

Related U.S. Application Data

(60) Provisional application No. 60/243,683, filed on Oct. 26, 2000.

(51) Int. Cl.$^7$ .................. G06F 13/00; G06F 15/173; H04L 12/50
(52) U.S. Cl. ................ 710/317; 710/38; 370/360; 370/422; 709/238
(58) Field of Search ................ 710/316–317, 710/38; 370/351–362, 419–423; 709/238–244

(56) References Cited

U.S. PATENT DOCUMENTS

| | | | | | |
|---|---|---|---|---|---|
| 5,299,190 | A | * | 3/1994 | LaMaire et al. | 370/413 |
| 5,371,495 | A | * | 12/1994 | Sturges et al. | 340/2.29 |
| 5,377,182 | A | * | 12/1994 | Monacos | 370/219 |
| 5,537,400 | A | * | 7/1996 | Diaz et al. | 370/412 |
| 5,734,649 | A | * | 3/1998 | Carvey et al. | 370/355 |
| 5,754,120 | A | * | 5/1998 | Argentati | 340/2.22 |
| 5,754,543 | A | * | 5/1998 | Seid | 370/351 |
| 5,781,546 | A | * | 7/1998 | Sethu | 370/389 |
| 5,848,066 | A | * | 12/1998 | Nazarian et al. | 370/380 |
| 5,862,128 | A | * | 1/1999 | Cooperman et al. | 370/236 |
| 5,923,644 | A | * | 7/1999 | McKeown et al. | 370/230 |
| 5,923,656 | A | * | 7/1999 | Duan et al. | 370/395.4 |
| 5,923,868 | A | * | 7/1999 | Nazarian et al. | 703/21 |
| 6,087,958 | A | * | 7/2000 | Arzt | 340/2.21 |
| 6,182,185 | B1 | * | 1/2001 | Stokes | 710/317 |
| 6,195,335 | B1 | * | 2/2001 | Calvignac et al. | 370/236 |
| 6,212,612 | B1 | * | 4/2001 | Turner | 711/170 |
| 6,243,664 | B1 | * | 6/2001 | Nazarian et al. | 703/14 |
| 6,317,598 | B1 | * | 11/2001 | Wiesen et al. | 455/443 |
| 6,574,669 | B1 | * | 6/2003 | Weaver | 709/239 |
| 6,618,379 | B1 | * | 9/2003 | Ramamurthy et al. | 370/395.41 |
| 6,717,945 | B1 | * | 4/2004 | Jue et al. | 370/392 |
| 6,747,971 | B1 | * | 6/2004 | Hughes et al. | 370/387 |
| 2001/0050916 | A1 | * | 12/2001 | Krishna et al. | 370/419 |

FOREIGN PATENT DOCUMENTS

| | | |
|---|---|---|
| JP | 06090242 | 3/1994 |
| WO | WO 99/40754 A1 | 8/1999 |

OTHER PUBLICATIONS

Chi, Hsin–Chou, et al., "Decomposed Arbiters for Large Crossbars with Multi–Queue Input Buffers", Computer Science Department, University of California, Los Angeles, California, BNSDOCID:<_10025212A_1>, pp. 233–238.

* cited by examiner

Primary Examiner—Sumati Lefkowitz
(74) Attorney, Agent, or Firm—Kudirka & Jobse, LLP

(57) ABSTRACT

A procedure is described for determining which source to connect to which destination in a non-blocking crossbar switch through which a plurality of sources may be attempting to gain access to a plurality of destinations. To this end, a metric is dynamically associated with each source and with each destination. Matching of sources to destinations is accomplished by iteratively assigning the destination having the smallest metric of all currently unmatched destinations to the source having the smallest metric of all currently unmatched source.

38 Claims, 14 Drawing Sheets

METHOD AND APPARATUS FOR DETERMINING CONNECTIONS IN A CROSSBAR SWITCH

RELATED APPLICATIONS

This application is related to, and claims priority of, U.S. provisional patent application, Ser. No. 60/243,683, filed Oct. 26, 2000 by Stuart P. MacEachern, Jacob Y. Bast, Raju C. Bopardikar and Jack J. Stiffler

FIELD OF THE INVENTION

This invention relates to data processing and communication systems in which switches are used dynamically to connect information sources to information destinations.

BACKGROUND OF THE INVENTION

Crossbar switches are widely used in computer and communications applications to connect a plurality of sources to a plurality of destinations. Since it is typically true that several sources may have outstanding requests for several destinations and many destinations may have multiple sources requesting access to them, some procedure must be implemented to assign sources to destinations during each switch cycle. Prior procedures have used various rules such as first-come-first-served, random assignment, and longest-queue-first (LQF) assignment in which an unmatched destination having the longest queue of requests is assigned to the as yet unmatched source requesting that destination also having the longest queue of outstanding requests. The first of these procedures suffers from the potential for "starvation", a problem in which a request can be left pending for an unlimited period of time. The second procedure, while making indefinite starvation less likely, still puts no absolute bound on the length of time before a request is served. The third procedure can be advantageous when each source has a relatively large number of requests pending for each destination, since it attempts to minimize the maximum queue lengths and hence minimize the maximum latency through the switch, thereby also avoiding starvation.

However, if the system in which the crossbar switch is embedded is reasonably well balanced with the number of requests over a given period of time rarely exceeding the rate at which the system is able to service those requests, the queue lengths tend to remain relatively short most of the time, with the result that some sources frequently have no requests pending for some destinations. In fact, if this situation fails to obtain for any significant period of time, the queue lengths tend to grow without limit, resulting in generally unacceptable performance.

Under well-balanced conditions then, maximum latency is generally not the primary measure of interest because all requests can be serviced quickly if the switch is used efficiently; that is, if as many connections as possible are made during each switch cycle. When all sources are requesting access to all destinations, all procedures result in full switch utilization since, regardless of how sources and destinations are matched at any intermediate stage in the matching procedure, there must be at least one unmatched source requesting any unmatched destination. Note that, in a full-duplex system, which is assumed for purposes of the discussion here although in no way essential to it, the number of potential sources necessarily equals the number of potential destinations. If the number of sources and the number of destinations are not equal, maximum switch utilization is still achieved by any matching procedure as long as all sources have outstanding requests for all destinations. However, in this case either some sources or some destinations, depending on the direction of the imbalance, obviously will not be matched.

However, when not all sources are requesting access to all destinations, it is easy to see that the switch efficiency is highly dependent on the matching procedure. Consider, for example, the case in which four sources, arbitrarily named A, B, C and D, are requesting access to four destinations, 1 2, 3, 4, and assume that source A has one request pending for destination 1, that source B has one request for destination 1 and one request for destination 2, that source C has one request for destination 1, one request for destination 2 and one request for destination 3, and that source D has one request for each of the four destinations. Under the maximum queue-length procedure, destination 1 is matched first since it has the most pending requests. Further, since destination 1 is matched to the source requesting it that has the longest request queue, it is matched with source D. Similarly, under the same criterion, destination 2 is then matched with source C leaving destinations 3 and 4 with no remaining unassigned sources requesting access to them. Consequently, the switch is only 50% utilized. However, 100% utilization could have been achieved by matching destination 1 with source A, destination 2 with source B, destination 3 with source C and destination 4 with source D.

Therefore, there is a need for a method and apparatus that insures the highest level of switch utilization.

SUMMARY OF THE INVENTION

In accordance with the principles of the present invention, a metric is dynamically associated with each source and with each destination. Matching of sources to destinations is accomplished by iteratively assigning the destination having the smallest metric of all currently unmatched destinations to the source having the smallest metric of all currently unmatched sources.

In accordance with one embodiment, the metric associated with destination d is the number $n_d(s)$ of different sources requesting that destination, and, the metric assigned to source s, is the number $n_s(d)$ of different destinations requested by that source. The resulting matching procedure is called a "least-requested-first" (LRF) matching since, as the name suggests, the first destination to be assigned to a source is the one, or one of the ones, having the fewest number of different sources requesting it and it is assigned to the source, or one of the sources, requesting access to it that is requesting access to the fewest number of destinations. After that assignment is made, the destination having the next fewest number of requests is matched to the, as yet unmatched, source requesting it that is requesting the fewest number of other destinations. This procedure is continued until there are no more destinations being requested by any source not already matched to some other destination.

In accordance with another embodiment, metrics can be used which cause the matching procedure to be the previously mentioned LQF procedure. More specifically, the source and destination metrics are defined as $G(s)=L_s-\Sigma_d q(s,d)$ and $G(d)=L_d-\Sigma_s q(s,d)$ with $q(s,d)$ the length of the queue of requests pending from source s for destination d, and $L_s$ and $L_d$ the maximum values the respective queue-length summations are allowed to assume for metric definition purposes; i.e., the summations are truncated at $L_s$ and $L_d$, respectively. With these definitions, an unmatched destination having the longest queue of requests is assigned to the as yet unmatched source requesting that destination also having the longest queue of outstanding requests.

In accordance with a further embodiment, the LQF and LRF metrics discussed above are combined, with the LRF metric assigned to destinations and the LQF metric assigned to sources. Therefore, in this embodiment, the metric associated with source s is G(s), as described above. Similarly, the metric associated with the destination d is the number $n_d(s)$ of different sources requesting that destination. In this case, an as yet unmatched destination being requested by the fewest number of sources is matched to the source having the longest queue of pending requests.

In still another embodiment, the LRF and LQF metrics are concatenated associating with each destination d the metric $n_d(s)$, G(d) and with source s the metric $n_s(d)$, G(s) with all these terms as previously defined. With these metrics the LRF algorithm alone determines the match unless there is more than one source or destination having the same LRF portion of the metric; in that case, the LQF algorithm determines the matching order.

In a further embodiment, each request is individually assigned a metric value which can include a part that applies to that request alone as well as a part that applies to the requesting source and hence uniformly to all of its requests. For example, in addition to the metric values previously mentioned, metric values that can be assigned individually to requests include a user-assigned priority, the length of time that a request has been pending and any other request specific information. Other combinations of these and other metrics are obviously possible.

BRIEF DESCRIPTION OF THE DRAWINGS

The above and further advantages of the invention may be better understood by referring to the following description in conjunction with the accompanying drawings in which.

DETAILED DESCRIPTION

Figure 1A:
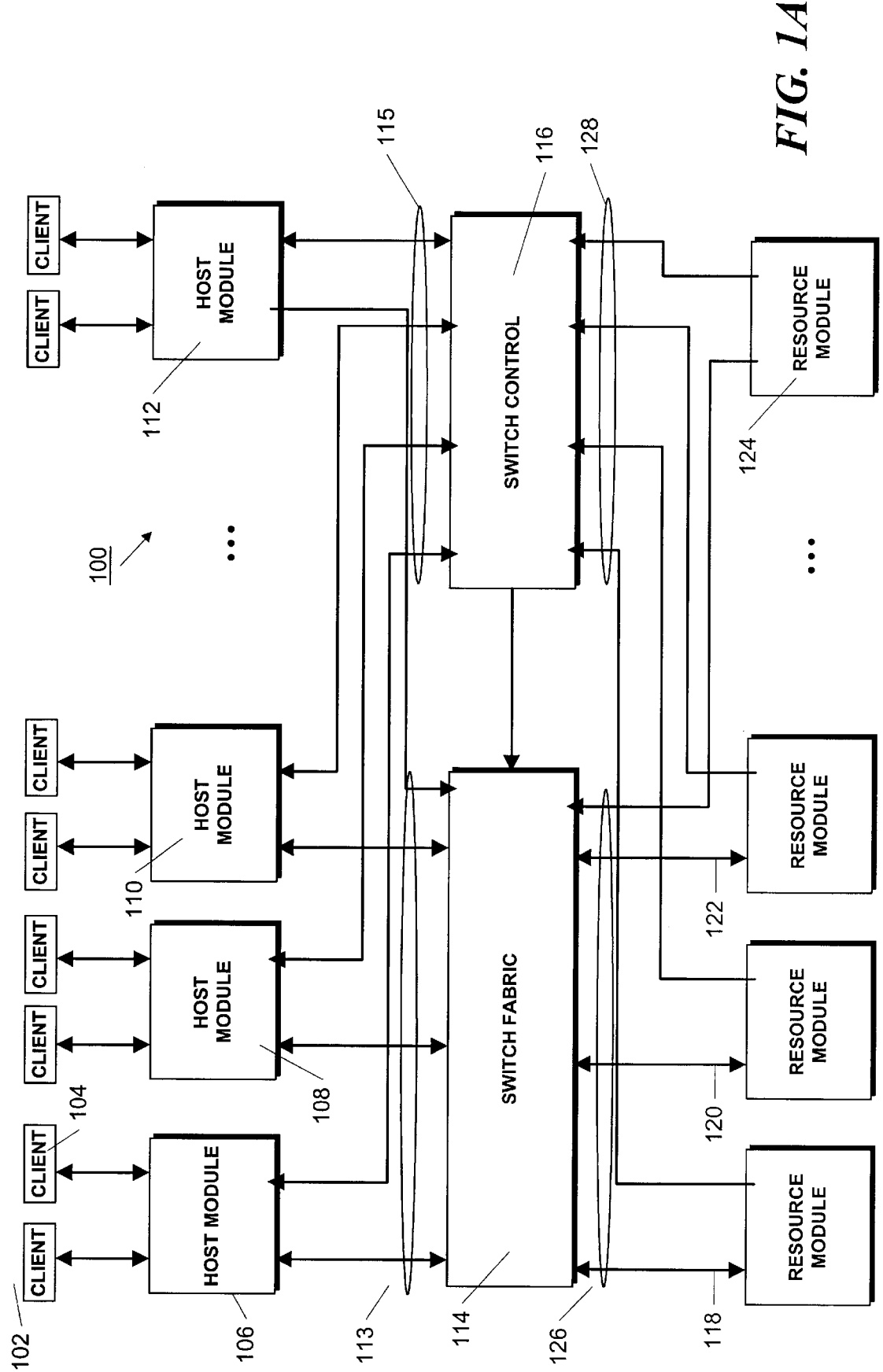
FIG. 1A is a block schematic diagram illustrating a computer system with a switch that connects data sources and destinations.

FIG. 1A shows a block schematic diagram of a system containing a switch fabric to which the inventive matching procedure can be applied. The exemplary system of FIG. 1A is discussed only for descriptive purposes, however, and should not be considered a limitation of the invention. Although the description below may refer to terms commonly used in describing particular computer and storage systems, the described concepts apply equally to other computer and storage systems, including systems having architectures that are dissimilar to that shown in FIG. 1A. The system 100 consists of a set of host modules 106–112 and resource modules 118–124. The host modules 106–112 provide one or more clients, of which clients 102 and 104 are shown, access to the system 100 and communicate with each client 102, 104 using the client's message passing protocol. The host modules 106–112 parse requests from the clients 102, 104 for access to resources (not shown) which are connected to the resource modules. At any given time, a host module may be either a source or a destination. For example, in the discussion that follows, the host modules 106–112 would be considered as sources when sending requests for data to the resource modules 118–124 and as destinations when receiving the requested data.

The resource modules 118–124 each support one or more resources and are responsible for the physical allocation of their resources. The resource modules provide data buffering and error checking and respond to requests from the host modules for access to their associated resources. In the discussion that follows, the resource modules would be considered as destinations when receiving requests for data from the host modules 106–112 and as sources when sending the requested data to the host modules.

The switch fabric 114 provides the command and data paths used to interconnect the other two module types and contains both the control and data switches. Illustratively, switch fabric 114 may comprise a non-blocking crossbar switch. The fabric 114 is connected to each of host modules 106–112 by means of data and control paths 113 and to resource modules 118–124 by data and control paths 126. The switch fabric 114 operates in cycles and, during each cycle, the fabric 114 can connect one or more data and control paths from a source to one or more destinations.

The switch fabric 114 is controlled by a switch control 116 and related control circuitry that controls the switch to connect the data sources and data destinations. The switch control 114 contains the apparatus that, according to the principles of the present invention, computes the above-described metrics and controls the switch fabric 114 accordingly. In order to set up switch fabric 114, switch control 116 receives requests for connections from host modules 106–112 over request paths 115 and receives requests for connections from resource modules 118–124 over request paths 128.

Figure 2A:
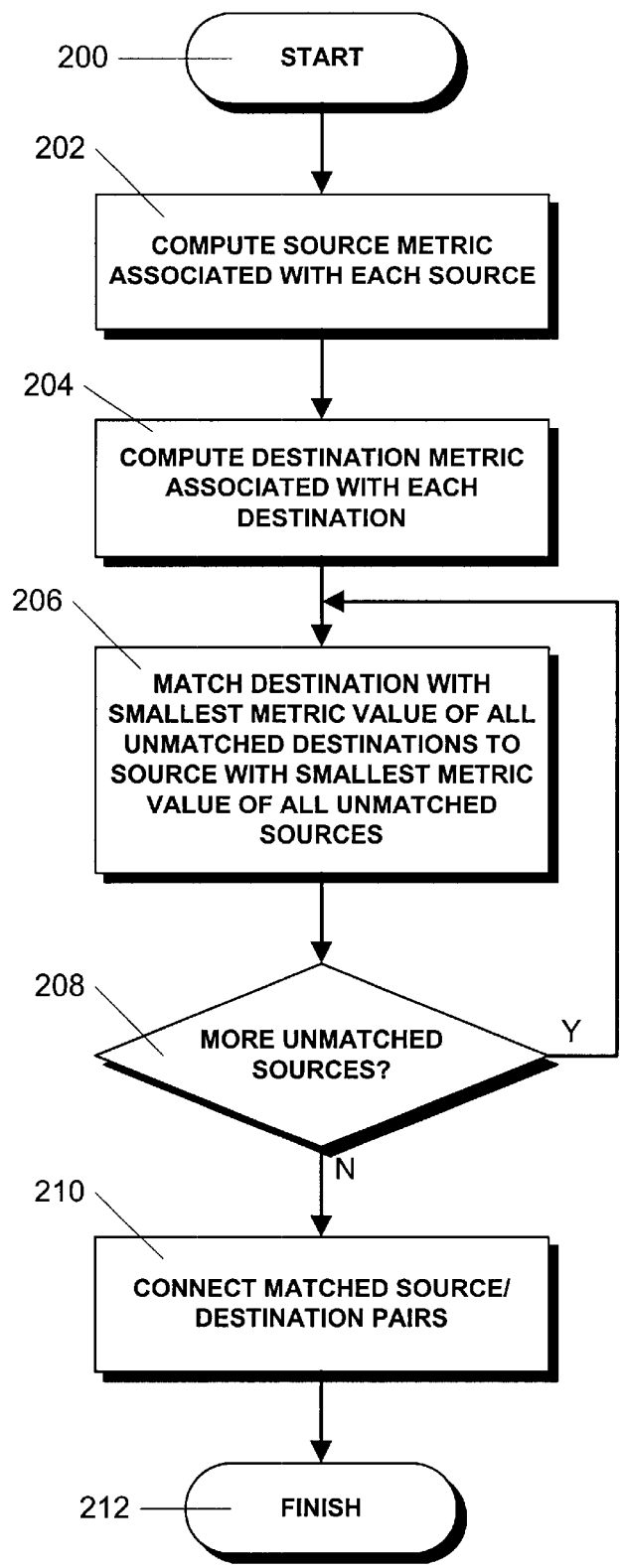
FIGS. 2A and 2B are flowcharts that illustrate the steps in two illustrative methods that match source/destination pairs in accordance with the principles of the invention.
Figure 2B:
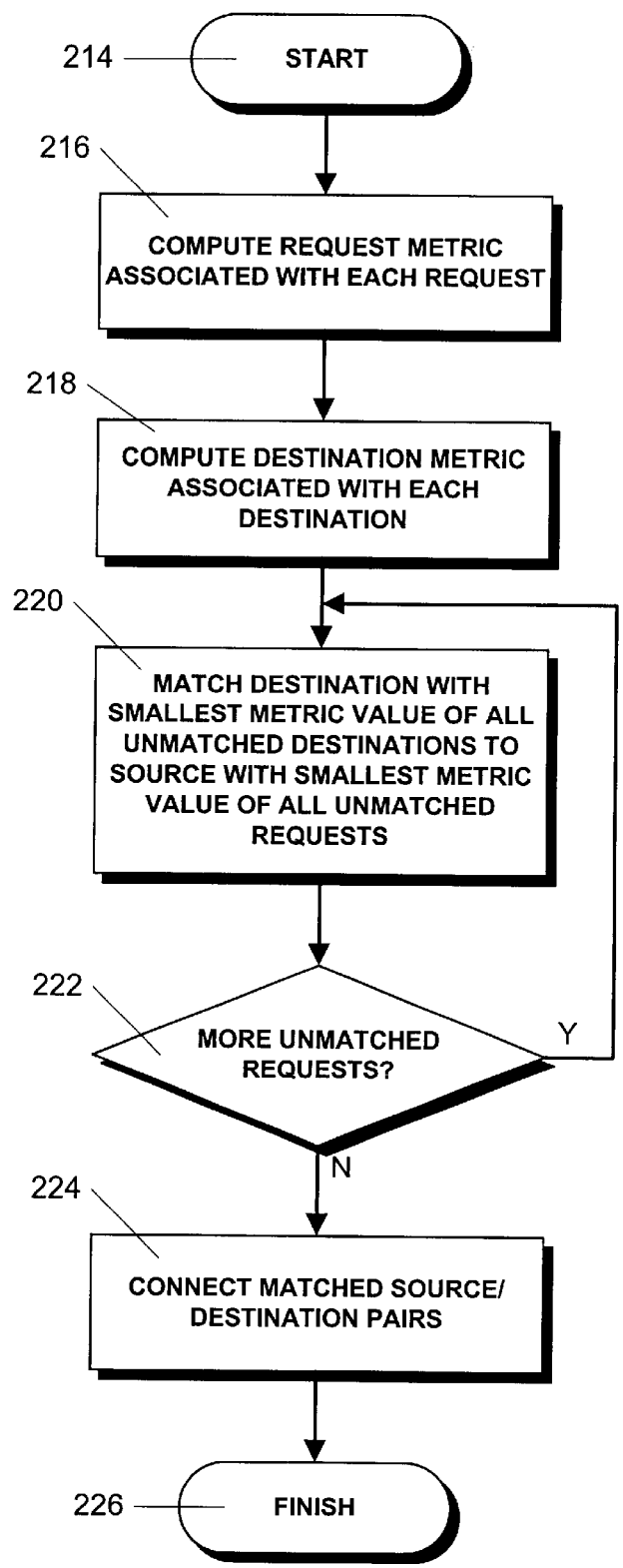

The method used by the switch control 116 to determine the connections in switch fabric 114 in accordance with the principles of the invention is shown in the flowchart of FIGS. 2A and 2B which show two embodiments of the invention. In particular, during one cycle, the metric values used to match sources and destinations are calculated. In the next cycle, connections are made in the switch fabric 114 in accordance with these metrics as discussed below. During this latter cycle, the metrics that will determine the connections during the next cycle are calculated and operation continues in this manner.

In the first embodiment shown in FIG. 2A, metric values are generated and associated with each source. In the second embodiment shown in FIG. 2B, metric values are generated separately for each request from each source. In particular, the inventive method in accordance with the first embodiment shown in FIG. 2A illustrates the computation of the metrics and the generation of source/destination pairs during each switch cycle. The method starts at step 200 and proceeds to step 202. In step 202 a metric value is computed and associated with each source. The computation of this value is discussed in detail below and depends on the particular metric that is being used. For example, this metric could be the aforementioned LQF or LRF metric or a combined metric with the LQF metric assigned to sources and a different metric assigned to destinations. In this latter embodiment, the metric associated to each source s is $G(s)=L_s-\Sigma_d q(s,d)$ with $q(s,d)$ the length of the queue of requests at source s for destination d, and $L_s$ the maximum value the queue-length summation is allowed to assume, as described above.

Next, in step 204, a metric is computed and assigned to each destination. This latter metric might be the LRF or LQF metrics described above. Alternatively, the metric might be a combined metric in which the metric associated with each destination d is the number $n_d(s)$ of different sources requesting that destination.

In step 206, a source is matched to a destination by assigning the destination having the smallest metric of all currently unmatched destinations to the source requesting that destination having the smallest metric of all currently unmatched sources. Then, in step 208, a check is made to determine whether any unmatched destination still exists. If an unmatched destination exists, then the process returns to step 206 to match another source/destination pair. Operation continues in this manner until all destinations for which requests are outstanding are matched. The method then finishes in step 210.

FIG. 2B also illustrates the computation of metrics and the generation of source/destination pairs during each switch cycle. The method starts at step 212 and proceeds to step 214. In step 214 a metric value is computed and associated with each request generated at each source. The computation of this value is discussed in detail below and depends on the particular metric that is being used. For example, in an extension of the LQF matching algorithm, a metric that could be assigned to a request from source s for destination d is the previously defined value q(s,d). Other metrics that can be individually associated with requests include a user-assigned priority, the length of time that a request has been pending and any other request specific information or combinations thereof.

Next, in step 216, a metric is computed and assigned to each destination. This latter metric might be, for each destination d, the LQF metric G(d) described above or the LRF metric $n_d(s)$, the number of different sources requesting that destination, again as previously defined, or any combination of those and other metrics.

In step 218, a source is matched to a destination by assigning the destination having the smallest metric of all currently unmatched destinations to the source requesting that destination having the smallest metric of all currently unmatched sources. Then, in step 220, a check is made to determine whether any unmatched destination still exists. If an unmatched destination exists, then the process returns to step 218 to match another source/destination pair. Operation continues in this manner until all destinations for which requests are outstanding are matched. The method then finishes in step 222.

Figure 3:
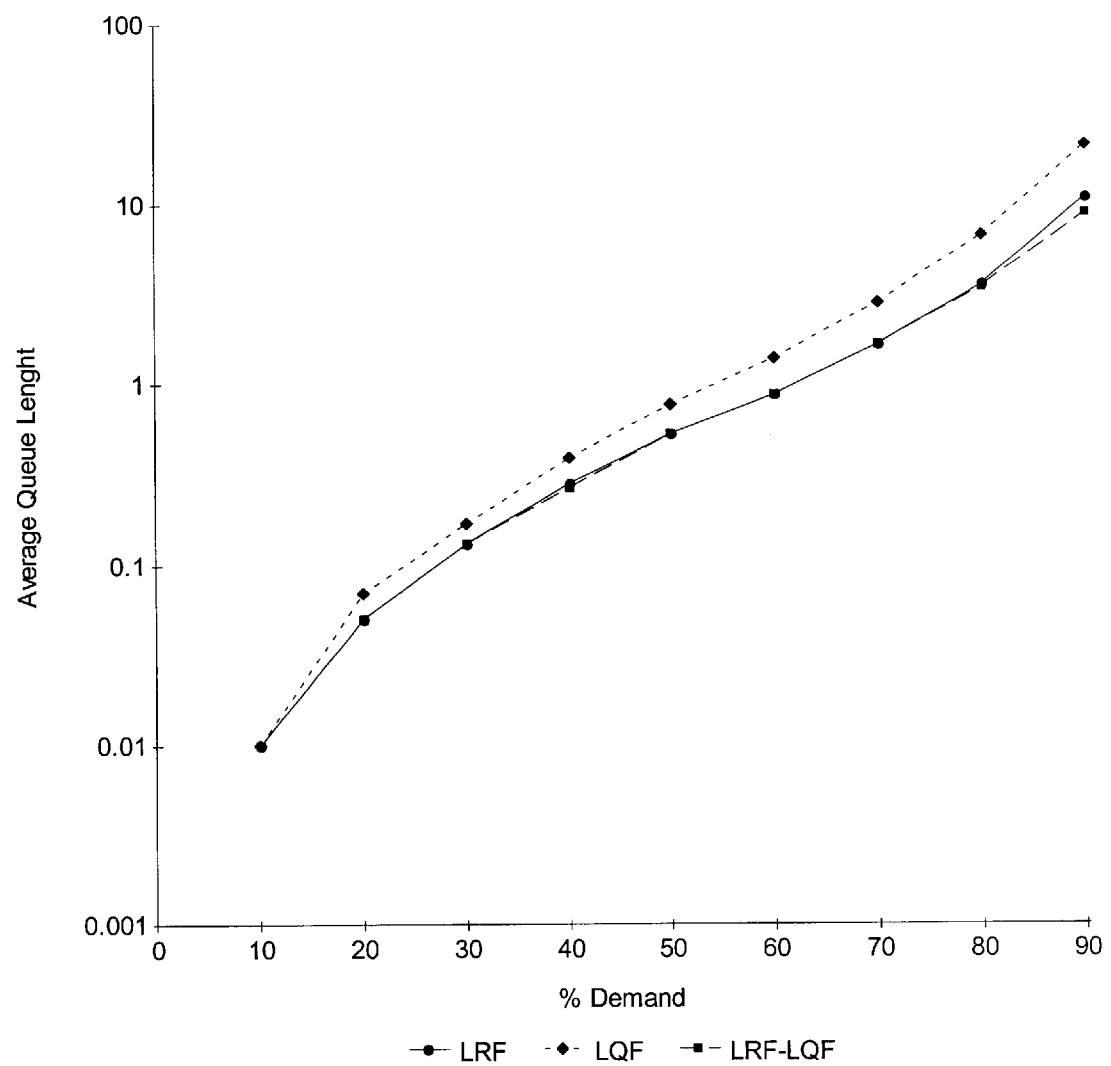
FIG. 3 shows the results of a simulation of a crossbar switch comparing average queue lengths achieved using various metrics associated with the sources and destinations.

As an indication of differences in performance resulting from associating different metrics with the sources and destinations, FIG. 3 shows the results of multiple Monte Carlo simulations of a sixteen-port crossbar switch comparing (1) average queue lengths achieved using an LRF metric associated with both the sources and destination (labeled LRF on the graph) with (2) average queue lengths obtained using an LQF metric associated with both sources and destinations (labeled LQF on the graph) and (3) the average queue lengths obtained using a combination of LRF and LQF metrics in which an LRF metric is associated with destinations and an LQF metric is associated with sources (labeled LRF-LQF on the graph.)

Each simulation entailed one million trials in which the expected number of requests submitted by the sources during each trial was equal to the specified percentage demand of the total capacity of the switch and in which requests from any source were equally likely to be directed to any destination other than itself. The average queue length shown is the average over all source queues (containing the outstanding requests from each source to all destinations) or, equivalently, over all destination queues (containing the pending requests for each destination from all sources.)

In all cases, if one or more sources or destinations had the same minimum metric, the first one having that metric was chosen. To avoid bias, the sources and destinations were always tested in the same order, but with the starting point incremented with each new matching cycle.

As can be seen, the LRF and the hybrid LRF-LQF metric associations result in shorter average queue lengths when compared to LQF metric association over virtually the entire range of demands. This advantage becomes significant, with a greater than 20% queue-length reduction, for switch demands exceeding 30% of the switch capacity and is nearly 50% by the time the demand reaches 80% of switch capacity.

Figure 4:
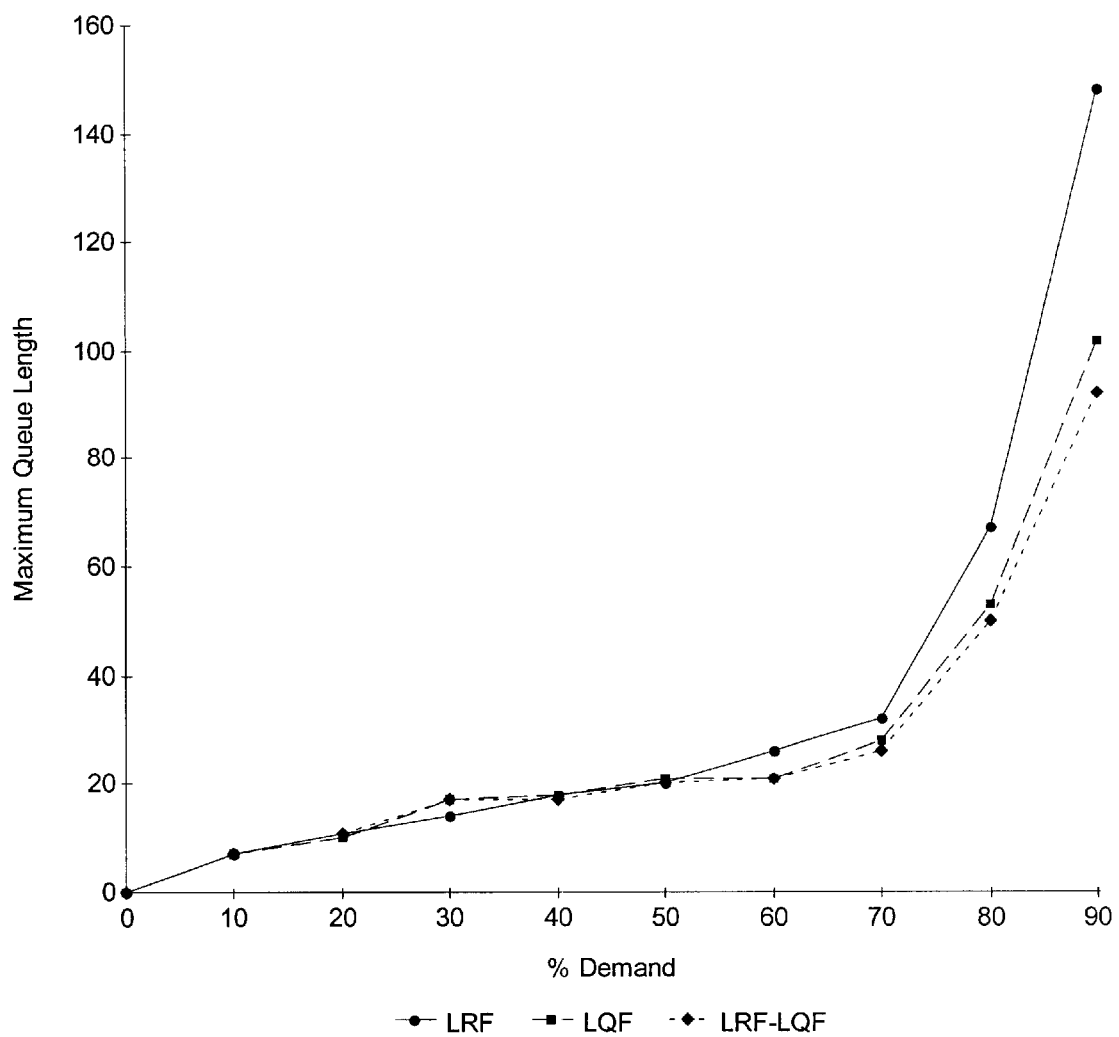
FIG. 4 shows the results of a simulation of a crossbar switch comparing maximum queue lengths achieved using various metrics associated with the sources and destinations.

Of course, average queue length may not always be the measure of interest, particularly when the demand approaches the switch capacity and queues can get quite long. In this case, maximum queue length may be of greater interest and LQF metric association might be expected to yield better performance under this measure. The results of multiple million-trial Monte Carlo simulations showing the maximum request queue length using the same three metric associations are shown in FIG. 4. As can be seen there, the LQF metric association does indeed offer an advantage for demands exceeding 50% of the switch capacity. Interestingly, the hybrid metric actually offers even better performance, while offering virtually identical average-queue-length performance to that achieved using the LRF metric (which can be seen by comparing FIG. 3 with FIG. 4).

Still another way of combining the LRF and LQF metrics is to concatenate them, associating with each destination d the metric $n_d(s)$, G(d) and with source s the metric $n_s(d)$, G(s) with all these terms as previously defined. With this metric, the LRF algorithm alone determines the match unless there is more than one source or destination having the same LRF portion of the metric; in that case, the LQF algorithm determines the matching order.

Numerous other metrics and combinations of metrics are possible. User-defined priorities can be submitted with each access request and used to modify the metric or to define a new one, for example, by adding the user-defined priorities to one of the previously mentioned metrics, by pre- or post-pending the priorities to the metrics, or by any other means that seems appropriate for a given application. Similarly, the length of time that a request has been pending can be used in ways comparable to those just outlined for priorities, thereby giving priority to older requests and attempting to limit the amount of time between the submission of a request and its servicing. All of these matching procedures, and any others that involving assigning metrics independently to each source and destination, are easily accommodated in a specific embodiment of a switch arbiter constructed in accordance with the principles of the invention and described below.

Figure 5:
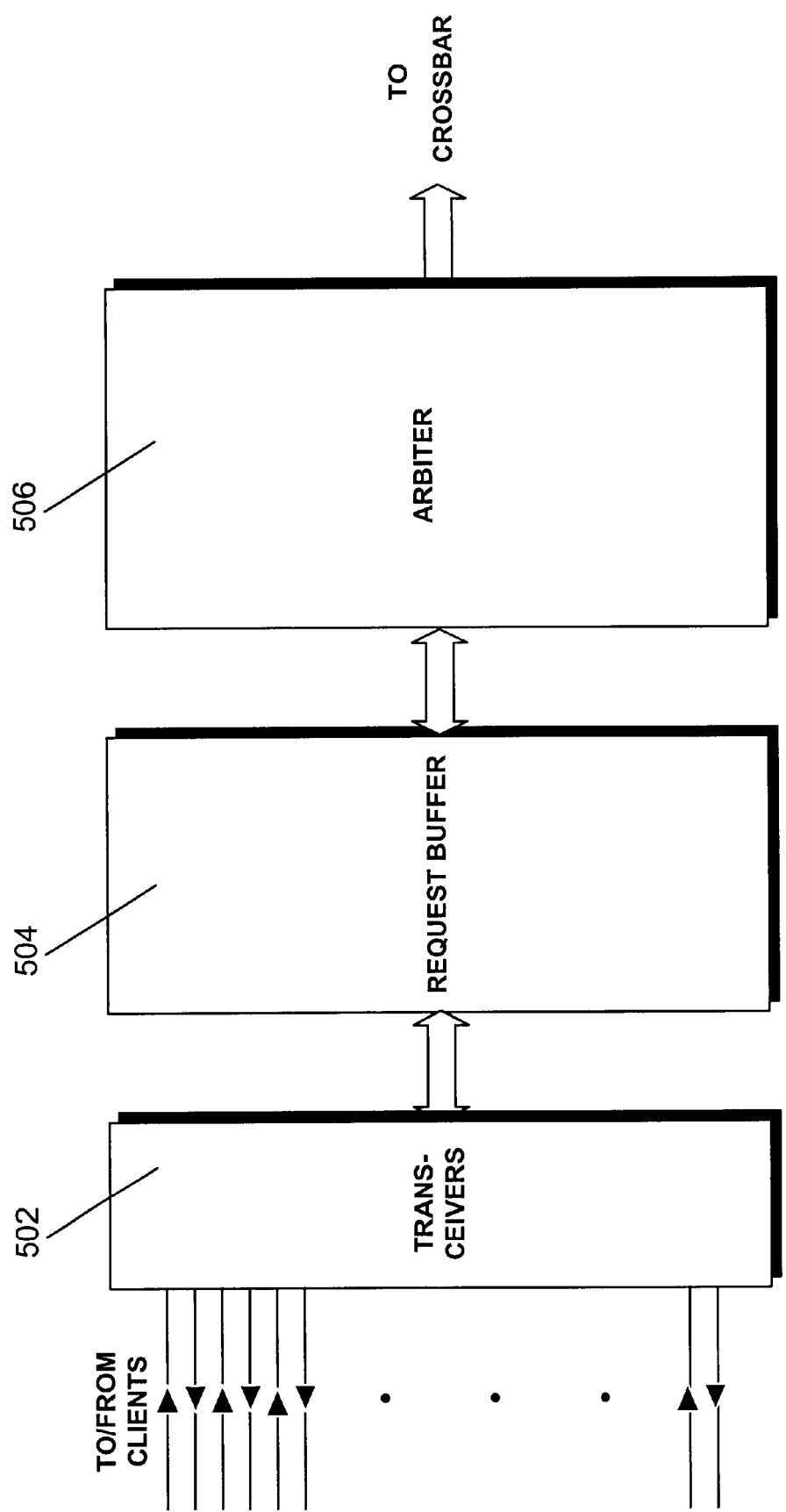
FIG. 5 is a block schematic diagram of the request buffer and arbiter that control the switch in accordance with the principles of the invention.

FIG. 5 illustrates, in block schematic form, a switch control for a switch such as switch 116 shown in FIG. 1A. Requests for specified destinations are received from client sources, such as host modules 106–110, through the transceivers 502, serially and synchronized to the same clock, and passed on to the request buffer 504.

Figure 1B:
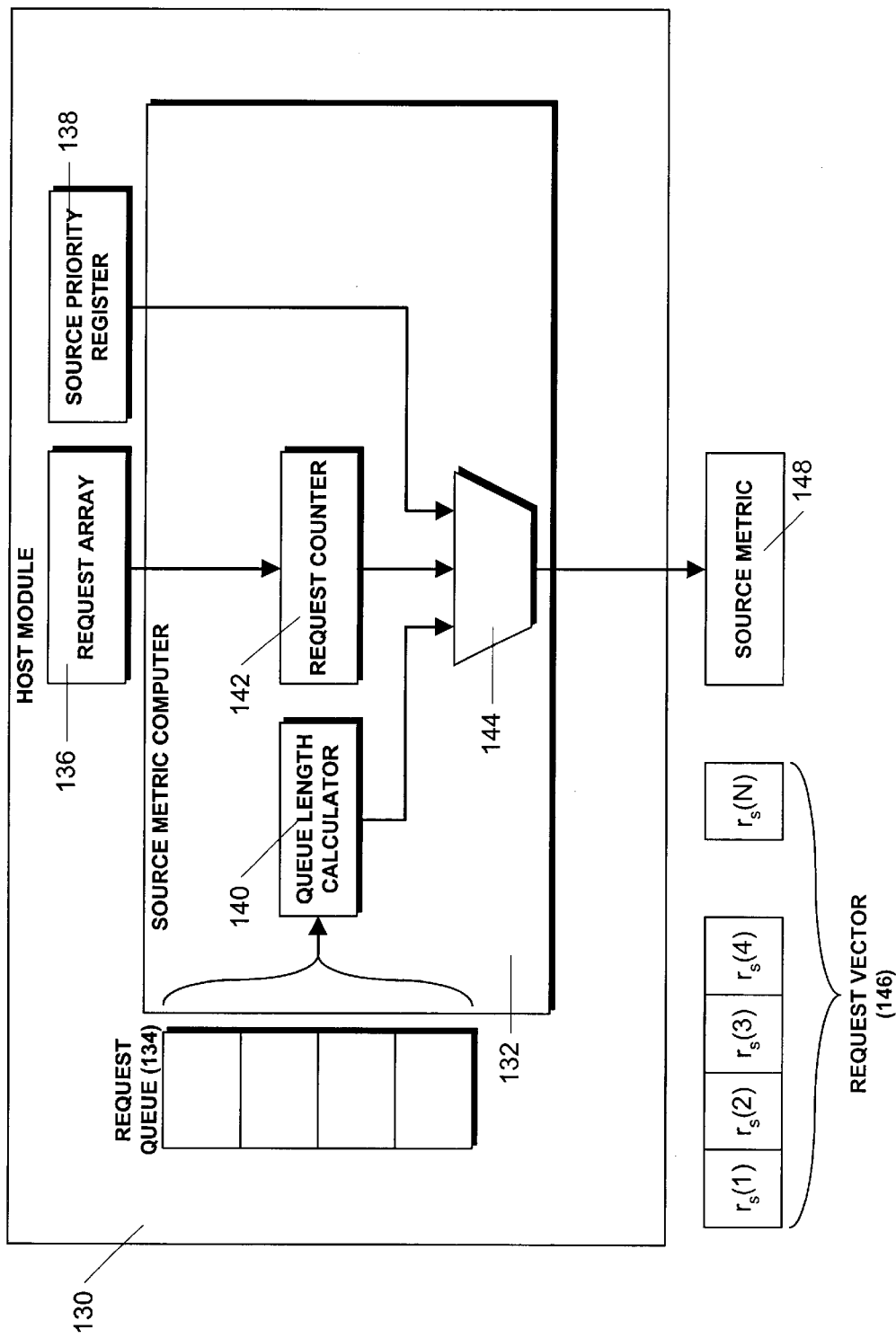
FIG. 1B is a block schematic diagram illustrating a more detailed block diagram of a source metric computer in a host module of the system shown in FIG. 1A.

A more detailed block diagram of a host module 130, such as host modules 106–110, is shown in FIG. 1B. The host module 130 comprises, among other components that have been omitted for clarity, a request queue 134 that holds pending requests, a request array 136 that stores requests for different destinations, a source priority register 138 that holds a user-assigned priority for that host module and a source metric calculator 132. During the first portion of each switch cycle (phase one), each of the switch's host modules 106–110 sends information indicating the destinations it is currently attempting to access. For each source s, this information includes its current source metric 148 and a request vector 146 having components $r_s(d)$, d=1,2 . . . N, identifying the destinations for which it has an outstanding request. Depending on the algorithm being implemented, the source metric might consist of a number of calculated values. These values can include the number $n_s(d)$ of different destinations to which the host module is requesting connection, which number is calculated by the request counter 142 from the request array. Alternatively, the source metric might be the length G(s) of the source request queue 134 as calculated by the queue length calculator 140. Similarly, the source metric can include a user-assigned current priority as stored in register 138, or various combinations of these and other parameters as indicated schematically by selector 144. Similarly, depending on the destination metric of interest, the request vector components $r_s(d)$ can be simple binary values indicating which destinations the client is requesting or they can be integers representing, for example, the number q(s,d) of requests pending at source s for each destination d, or the priorities associated with those requests.

The request buffer 504 stores the source vectors and metrics, calculates the destination metrics and passes the results on to the arbiter 506. During the second switch-cycle phase (phase two), the arbiter 506 orders the metrics associated with each source and those associated with each destination, matches the sources and destinations in accordance with those ordered metrics and sends that information back to the request buffer 504. The request buffer 504 then forwards the matching results back to the sources, thereby informing them of the destination to which they will be connected during the next switch cycle.

Figure 6:
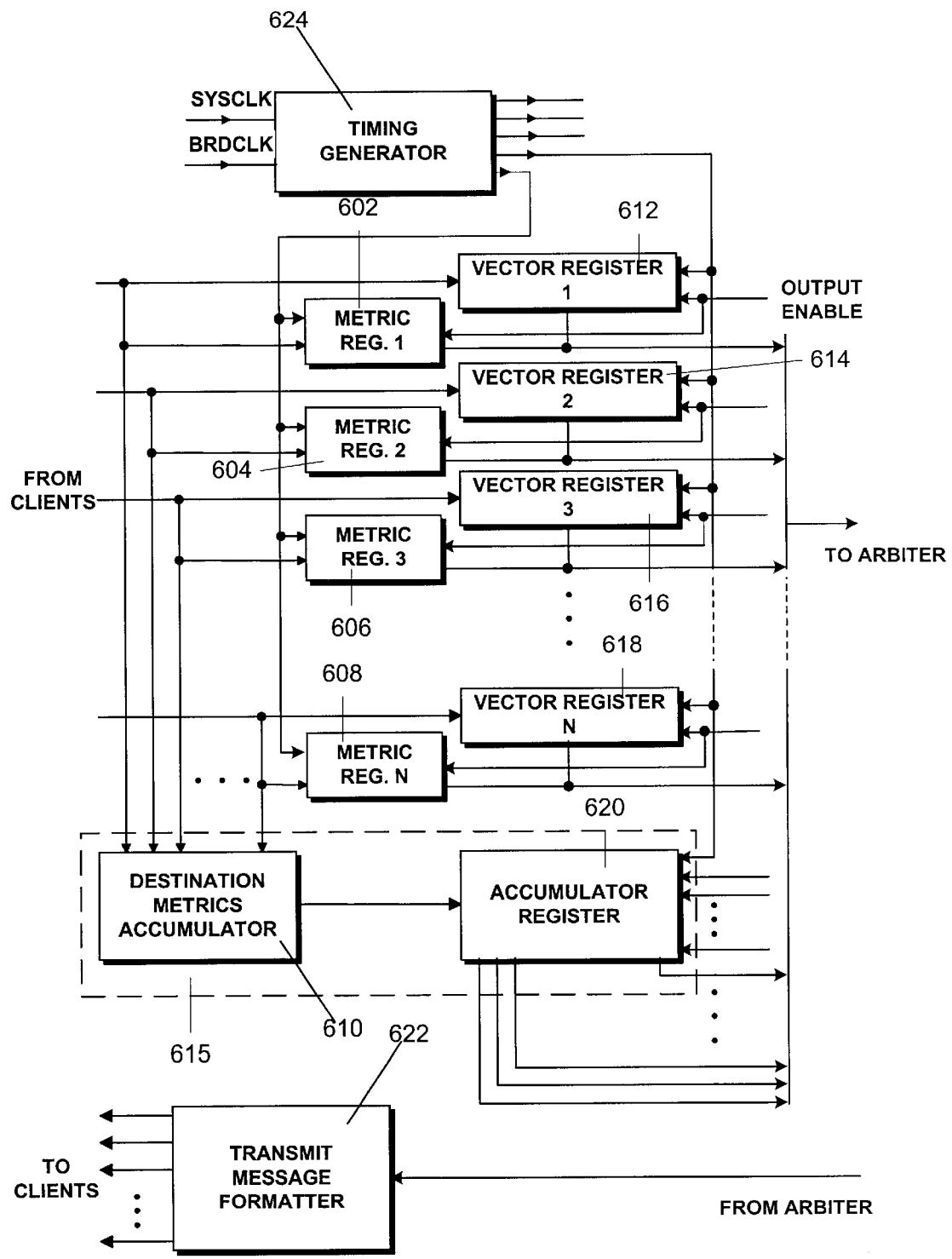
FIG. 6 is a block schematic diagram illustrating in more detail the construction of the request buffer.

FIG. 6 shows a more detailed block diagram of one implementation of the request buffer 504. The source vectors received from the sources are loaded into vector registers 612–618 and the source metrics are loaded into metric registers 602–608. In parallel with this loading operation, the destination metrics are calculated by the destination metric computer 615 from the source vectors and metrics in accumulator 610 and shifted into accumulator register 620. If the source's transmitter is busy, it sends an all-zeros vector (except possibly for the component $r_s(s)$, i.e., the "self-reference component"). If its receiver is busy (i.e., if it is unable to serve as a destination), it sets $r_s(s)=1$; otherwise it sets $r_s(s)=0$.

The structure of the source metrics and the implementation of destination-metrics accumulator 610, of course, both depend on the matching algorithm being used. If the matching algorithm is the previously discussed LRF algorithm, for example, the source metrics consist of the numbers $n_s(d)$ of different destinations requested by each source s and the destination-metric accumulator determines the number $n_d(s)$ of different sources requesting each destination d by simply summing the number of requests received for that destination. If the LQF metric is used, the source s request vector must contain the lengths q(s,d) of the source queues for each destination d; accumulator 610 then sums those numbers on a per-destination basis, truncates each sum at the maximum allowed value and produces the previously defined difference G(d) between that maximum value and the accumulated value as the metric for each destination d. The source metrics G(s) can be sent from the source in the field reserved for that purpose or, alternatively, metric registers 602–608 could themselves be implemented as accumulators and used to sum up the request vector components for each source. In one implementation, $n_d(s)$ is used as the metric for each destination d and G(s) as the metric for each source s since that results in superior performance under both the average-queue-length and the maximum-queue-length criteria.

In this embodiment of the invention, the request vectors, whether binary or not, are translated into binary values before being presented to the arbiter (506). For example, if the dth component of the request vector for source s is q(s,d), its binary translation is 1 if q(s,d)>0 and 0 otherwise. This binary translation, however, is not essential to the invention; a modification to the embodiment described here that does not impose that restriction is described below. The present embodiment applies to any matching algorithm in which, during each switch cycle, there is one metric assigned to each source and provided by that source along with its request vector and one metric assigned to each destination that can be either calculated from information provided by the sources or is provided directly by the destinations.

Transmit-message formatter 622 passes the source/destination matches determined by the arbiter back to the clients, thereby informing them of the destination to which they will be connected during the next switch cycle.

Timing for the transceivers (502), the request buffer (504), the arbiter (506) and the crossbar switch 116 (FIG. 1A) is derived by timing generator 624 from the board clock (BRDCLK) and the system clock (SYSCLK). The latter clock is used by all system components to coordinate transfers across the switch. The board clock runs at half the frequency of the system clock and is used to derive all other timing signals.

Figure 7:
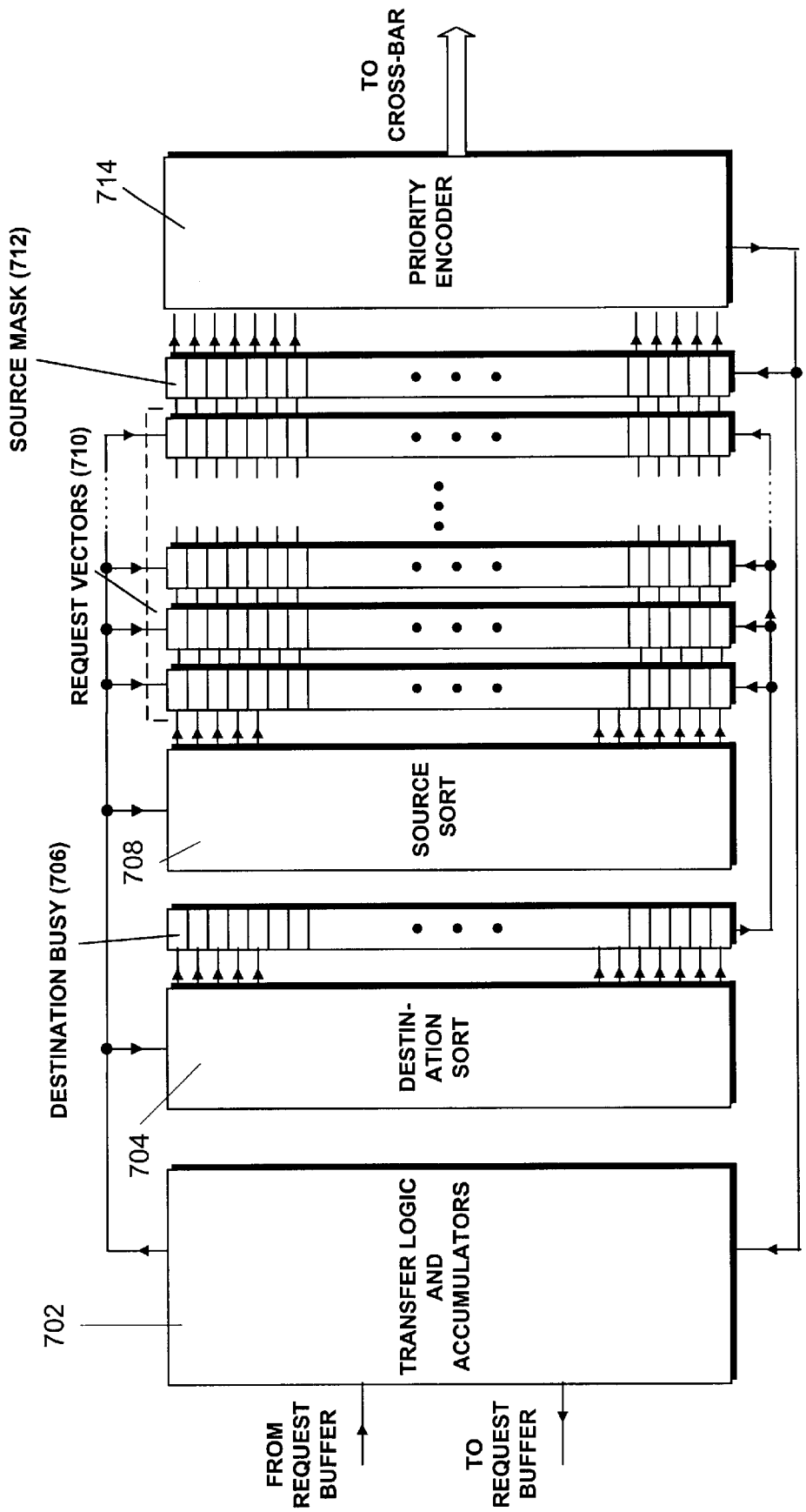
FIG. 7 is a block schematic diagram illustrating in more detail the construction of the arbiter.

FIG. 7 shows an illustrative embodiment of the arbiter 504 shown in FIG. 5. During each of the N transfer cycles comprising phase two of the switch cycle, the source and destination metrics and the request vector corresponding to one client are transferred in parallel to the arbiter from the request buffer 502 and received through the transfer logic and control section 702. The metrics are loaded along with the source/destination address, into the source and destination metric sorters (708 and 704, respectively). One component of the request vector is simultaneously loaded into each of the request-vector registers 710 and the self-reference component $r_s(s)$ is loaded into the busy register 706, thereby setting it to "busy" if $r_s(s)=1$. The self-reference stage in the request-vector register itself is always set to zero. To eliminate bias when more than one source has the same minimum metric, this data is transferred to the arbiter cyclically beginning, on the ith switch cycle, with the ith source and the ith destination, modulo N.

The arbiter sorts both the sources and the destinations based on their associated metric values. The request vectors in registers 710 can be regarded as rows in an N×N matrix. These rows are permuted by the arbiter as the sources are sorted by metric value. The smallest destination metric value determines, in accordance with the procedure disclosed here, the first destination to be matched to a source. Its address, unless inhibited by a corresponding busy bit, is used to enable the outputs from the column in the matrix 710 corresponding to that destination. Busy bits are used by a destination for flow control purposes when its input buffers are full and it cannot accept new inputs. A busy bit in one stage of register 706 inhibits the transfer of a destination address from the destination sorter 704 to the request vectors 710.

After the sources and destinations are sorted, the priority encoder 714 selects, from the sources requesting the destination having the smallest metric, that source having the smallest metric and transfers the addresses of the paired source and destination back through the transfer and control logic 702 to the transmit message formatter 622 (FIG. 6). If several destinations or sources have the same metric values, the last one submitted to the sorter wins in the embodiment described here. Since sources and destinations are presented to the arbiter sequentially beginning with a different source and destination on each switch cycle, this does not favor any particular source or destination.

Figure 8:
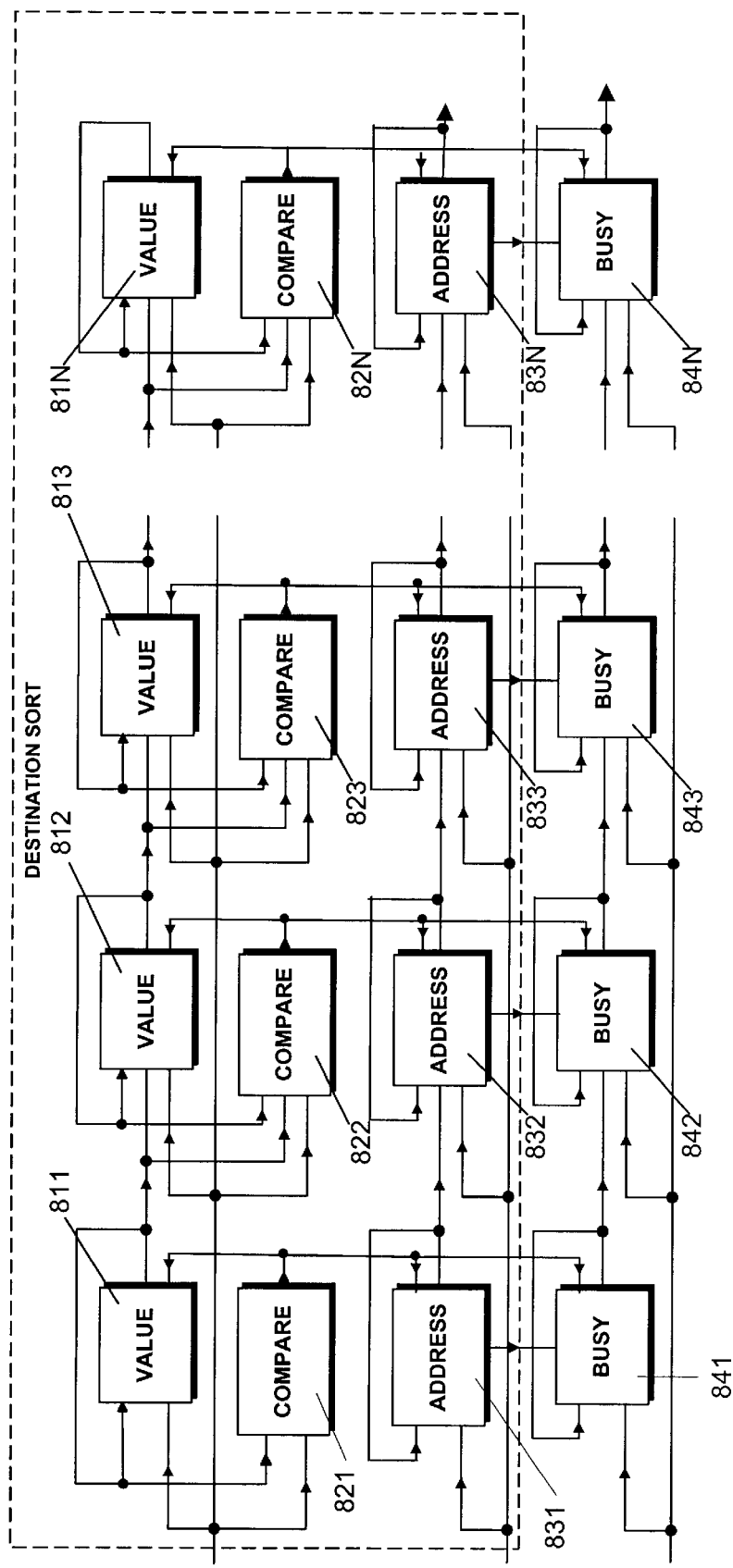
FIG. 8 is a block schematic diagram illustrating in more detail the construction of the destination sort register used in the arbiter.
Figure 9A:
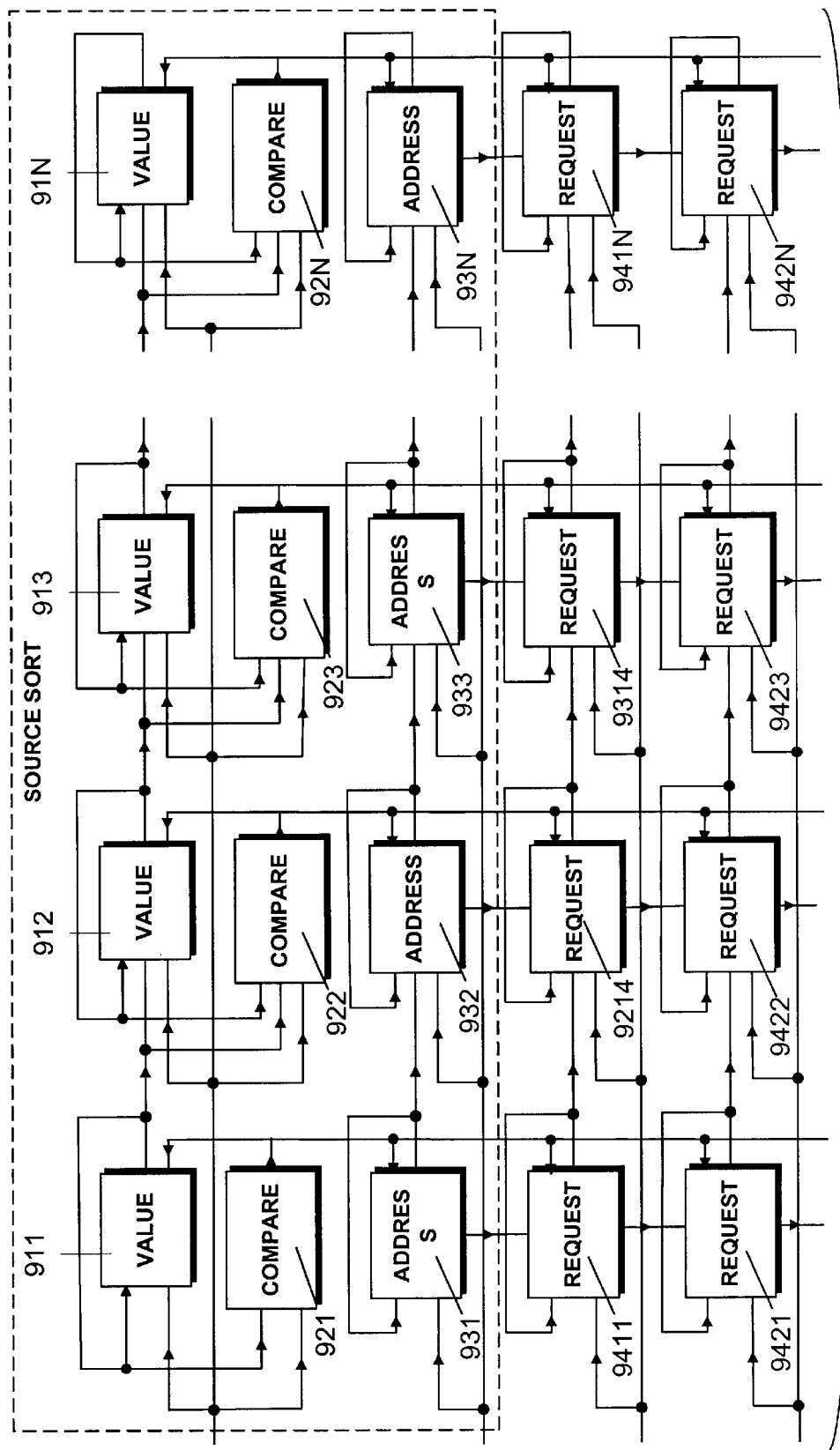
FIGS. 9A and 9B, when placed together, form a block schematic diagram illustrating in more detail the construction of the source sort register used in the arbiter.
Figure 9B:
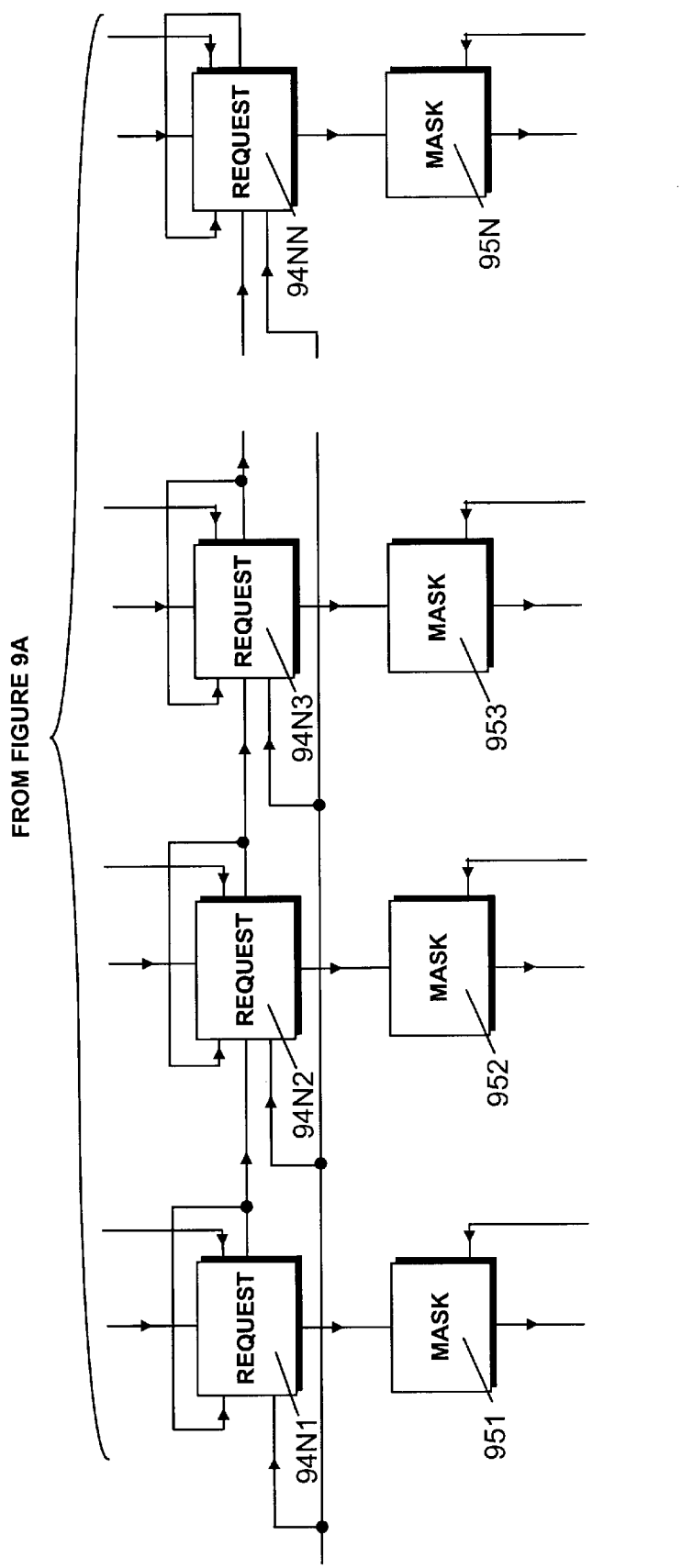

As the source and destination metric values are being loaded into their respective sort registers, the logic automatically sorts them in order of their values, as can be seen in greater detail in FIGS. 8, 9A and 9B.

As shown in FIG. 8, the destination addresses are shifted sequentially into the address registers 831–83N, the associated metrics are shifted into the value registers 811–81N and the associated busy bits are shifted into registers 841–84N. As each new value, $V_{new}$, is shifted in, the ith stage in the compare logic 821–82N compares it with the value $V_i$ currently stored in its associated value register and the value, $V_{i-1}$, stored in the value register of its immediate predecessor. The compare logic then implements the following decision rule based on the relative values $V_{new}$ $V_i$ and $V_l$ and $V_{i-1}$.

| | |
|---|---|
| If $V_{new} < V_i$ | retain the current contents of the value, address and busy bit registers. |
| If $V_i \leq V_{new} < V_{i-1}$ | replace the current contents with the new value, address and busy bit inputs. |
| If $V_{i-1} \leq V_{new}$ | replace the current contents with value, address and busy bit values stored in the preceding stage. |

It is easily seen that the register contents, after all destination addresses and values have been shifted in, will be sorted in descending order of their associated values.

In a similar manner, as the source values, addresses and request vectors are shifted in, the comparators 921–92N, shown in FIG. 9A, are used to sort the source addresses 931–93N and the corresponding request vectors 941N–94NN (shown in FIGS. 9A and 9B) in descending order of their associated metric values 911–91N.

If the busy bit in the last stage of the busy register 841–84N is not set, the arbiter decodes the address 83N at the last stage of the destination sort register 831–83N and uses the result to enable the outputs from the associated request vector 710 (FIG. 7). That is, if the decoded destination address is d, the outputs of register 94d1–94dN are enabled. The enabled register outputs indicate the sources that are requesting access to destination d. These outputs are passed through a source mask register 712 that corresponds to register 951–95N in FIG. 9B. This register is initially set to an all-zeros (no masking) state. The masked outputs are passed on to the priority encoder 714 in FIG. 7 which simply selects the address from the address register 931–93N corresponding to the first (i.e., the bottom-most in FIG. 7) enabled input.

The priority encoder 714 then sets the mask bit for the selected address, shifts the destination sort register 704 one position and repeats the process. If no unmasked sources are requesting a given destination, the register is simply shifted without a match having been made. This process continues until matches have been attempted for all destinations not flagged as busy. If, at any step during this process, the last stage of the destination busy register 706 is set (that is, if the corresponding destination has initiated flow control) no request vectors are enabled for that destination and no match is made.

Finally, the priority encoder 714 encodes the addresses of the matched source/destination pairs in a format recognized by the crossbar switch logic and passes the results on to the switch to be used during the next switch cycle.

The arbiter disclosed in the preceding paragraphs matches sources and destinations in accordance with any matching rule that can be implemented by matching minimum-metric destinations to minimum-metric sources. It does not accommodate matching rules that assign metrics independently to each request as opposed to each source and destination.

Matching rules that do allow individual request metrics to be taken into account can be implemented by expanding the request registers 9411–94NN to n-bits each, thereby allowing up to $2^n$ different values to be associated with each request. The priority encoder 714 in this case must now select the first (i.e., the one closest to the bottom in FIG. 7) input not having a smaller value than any of the succeeding (closer to the top in FIG. 7) inputs. In all other respects, the previous description applies to this implementation as well. However, this approach requires a much more complex priority encoder 714 with a consequent significant increase in the time required to make matching decisions.

Figure 10:
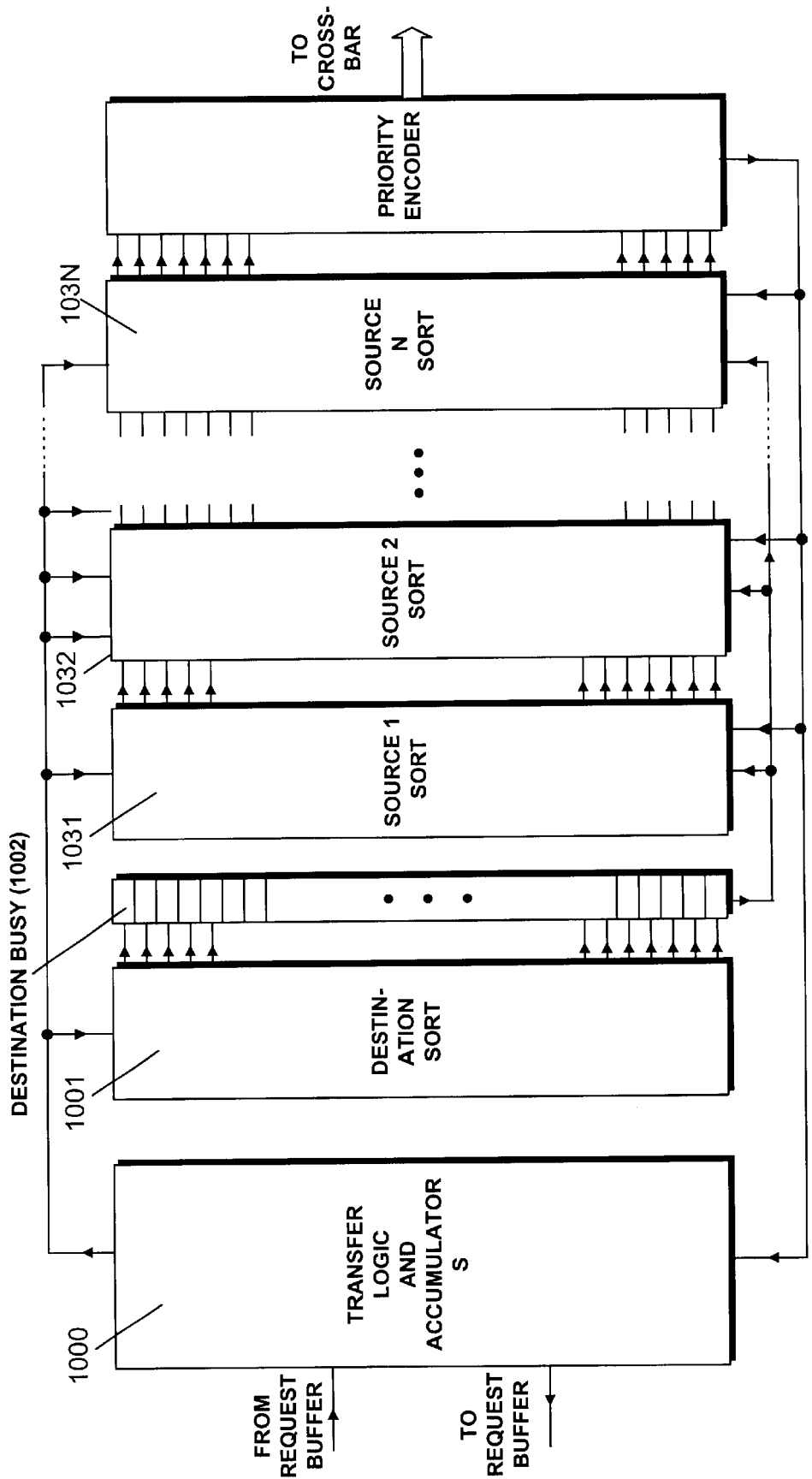
FIG. 10 is a block schematic diagram of an alternative embodiment of the arbiter.

Another variation on the implementation described above is shown in FIG. 10. This latter implementation also allows metrics to be assigned to each request and to each destination, but does not increase the complexity of the priority encoder 1006. In this implementation, the source-sort register 708 and the request vector registers 710 of the previous implementation are replaced by N source-sort registers 1031–103N. Requests are loaded as before, but in this case, each request is loaded with its own metric rather than being associated with a single source metric. Destination metrics are determined as previously described and loaded into the destination-sort register 1002 and their corresponding busy bits loaded into the destination-busy register 1004.

The destination-sort logic remains as shown in FIG. 8. The logic for each of the N source sorters, as shown in FIG. 11, consists of value registers 1111–111N, into which the metrics are sequentially loaded, address registers 1131–113N for holding the corresponding addresses, mask registers 1141–114N and comparator logic 1121–112N identical to that described in conjunction with FIGS. 9A and 9B.

Returning to FIG. 11, the source-sort registers 1131–113N are all loaded, beginning, as before, starting, on the jth switch cycle, with the jth source, modulo N, from the request buffer by way of the transfer logic 1000. The destination register is simultaneously loaded, as before, also starting with the jth destination on the jth switch cycle, with associated metrics determined in accordance with any of the previously mentioned techniques. As they are being loaded, the requests from each source for each of the N destinations are sorted based on their metrics and the destinations similarly sorted based on their metrics.

Figure 11:
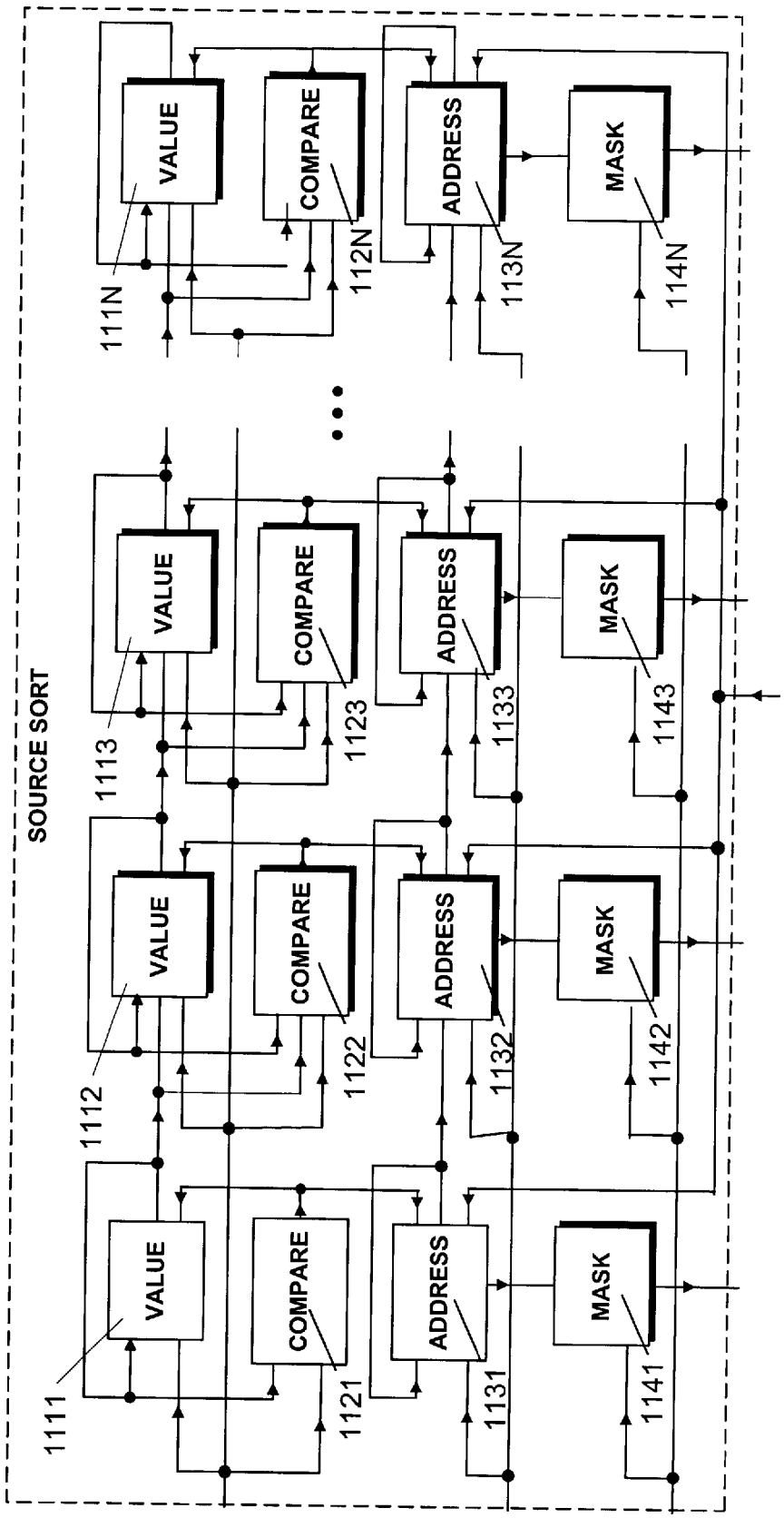
FIG. 11 is a block schematic diagram illustrating in more detail the construction of the sort registers used in the alternative embodiment of the arbiter.

The outputs from one of the source-sort registers 1131–113N corresponding to the smallest-metric, unmatched (and not busy) destination are then enabled and, unless masked by a stage of the mask register, shown in FIG. 11 as registers 1141–114N, the outputs are presented to the priority encoder 1006. The priority encoder 1006 simply selects the source address from one of registers 1131–113N corresponding to the first (nearest to the bottom in FIG. 10) enabled input. A bit in one of mask registers 1141–114N is set when the requests are loaded if the corresponding source does not have a request for the corresponding destination. The priority encoder 1006 also sets all mask bits associated with a given source once that source has been matched. It accomplishes this, in this implementation, by broadcasting the address of the winning source to all source-sort registers 1131–113N. Those locations having that address then set the corresponding bit in their mask register, thereby preventing that source from subsequently competing for any other destination.

The advantage of this latter implementation over that having only one source sort register is that each request can be individually assigned a metric that takes into account a value that applies to that request alone as well as values that apply to the requesting source and hence uniformly to all of its requests. For example, in addition to the metrics previously mentioned, metrics that can be assigned individually to requests include a user-assigned priority, the length of time that a request has been pending and any other request specific information.

A software implementation of the above-described embodiment may comprise a series of computer instructions either fixed on a tangible medium, such as a computer readable medium, e.g. a diskette, a CD-ROM, a ROM memory, or a fixed disk, or transmissible to a computer system, via a modem or other interface device over a medium. The medium either can be a tangible medium, including, but not limited to, optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, although the description was directed to a particular hardware system, other hardware and system software could be used in the same manner as that described. Other aspects, such as the specific instructions utilized to achieve a particular function, as well as other modifications to the inventive concept are intended to be covered by the appended claims.

What is claimed is:

1. A method for determining connections in a multipath switch between a plurality of sources and a plurality of destinations wherein each source generates one or more requests for connection to one of the plurality of destinations, comprising:

(a) associating a metric having a value dynamically computed from first predetermined criteria with each source;

(b) associating a metric having a value dynamically computed from second predetermined criteria with each destination;

(c) connecting a destination having the smallest metric value of all unconnected destinations to a source requesting that destination having the smallest metric value of all unconnected sources; and (d) repeating step (c) until all sources are connected to requested destinations.

2. The method of claim 1 wherein step (a) comprises computing the metric value for a source to be equal to the number of different destinations requested by the source.

3. The method of claim 1 wherein step (b) comprises computing the metric value for a destination to be equal to the number of different sources requesting that destination.

4. The method of claim 1 wherein step (a) comprises computing the metric value for a source to be equal to the number of unconnected requests generated by that source.

5. The method of claim 1 wherein step (b) comprises computing the metric value for a destination to be equal to the number of unconnected requests for that destination.

6. The method of claim 1 wherein step (a) comprises:

(a1) computing a value equal to the number of different destinations requested by each source;

(a2) computing a value equal to the number of unconnected requests generated by each source; and (a3) computing the metric value of each source as the combination of the value computed in step (a1) with the value determined in step (a2).

7. The method of claim 1 wherein step (b) comprises:

(b1) computing a value equal to the number of different sources requesting each destination;

(b2) computing a value equal to the number of unconnected requests for that destination; and (b3) computing the metric value of each source as the combination of the value computed in step (b1) with the value determined in step (b2).

8. The method of claim 1 further comprising (f) assigning each request a metric having a first value that is dynamically computed from characteristics of the each request and a second value is dynamically computed from characteristics of the source generating the each request.

9. The method of claim 8 wherein the metric first value comprises at least one of the group consisting of a user-assigned priority value and the length of time that the each request has been pending.

10. The method of claim 8 wherein the metric second value comprises the number of different destinations requested by the each source.

11. The method of claim 8 wherein the metric second value comprises the number of unconnected requests generated by the each source.

12. The method of claim 8 wherein the metric second value comprises the combination of the number of different destinations requested by the each source with the number of unconnected requests generated by the each source.

13. Apparatus for determining connections in a multipath switch between a plurality of sources and a plurality of destinations wherein each source generates one or more requests for connection to one of the plurality of destinations, comprising:
   a source metric computer that generates source metric information having a value dynamically computed from first predetermined criteria with each source;
   a destination metric computer that generates destination metric information having a value dynamically computed from second predetermined criteria with each destination; and
   an arbiter that repeatedly connects a destination having the smallest destination metric value of all unconnected destinations to a source requesting that destination having the smallest source metric value of all unconnected sources until all sources are connected to requested destinations.

14. The apparatus of claim 13 wherein the source metric computer comprises a request counter that computes the metric value for each source to be equal to the number of different destinations requested by the each source and a selection mechanism that forwards the source metric information to the destination metric computer.

15. The apparatus of claim 13 wherein the destination metric computer comprises a destination metric accumulator that receives the source metric information and computes the metric value for a destination to be equal to the number of different sources requesting that destination.

16. The apparatus of claim 13 wherein the source metric computer comprises a queue length calculator that computes the metric value for a source to be equal to the number of unconnected requests generated by that source.

17. The apparatus of claim 13 wherein the destination metric computer comprises a destination metric accumulator that receives the source metric information and computes the metric value for a destination to be equal to the number of unconnected requests for that destination.

18. The apparatus of claim 13 wherein the source metric computer comprises:
   a request counter that computes a request value equal to the number of different destinations requested by each source;
   a queue length calculator that computes a queue length value equal to the number of unconnected requests generated by each source; and
   a selector mechanism that generates the metric value of each source as the combination of the request value with the queue length value.

19. The apparatus of claim 13 wherein the destination metric computer comprises:
   a destination metric accumulator that computes a request value equal to the number of different sources requesting each destination and computes a queue length value equal to the number of unconnected requests for that destination; and
   an accumulator register that generates the metric value of each source as the combination of the request value with the queue length value.

20. The apparatus of claim 13 wherein the source metric computer further comprises a source priority register that assigns each request a metric having a first value that is dynamically computed from characteristics of the each request and means for dynamically computing a second value from characteristics of the source generating the each request.

21. The apparatus of claim 20 wherein the metric first value comprises at least one of the group consisting of a user-assigned priority value and the length of time that the each request has been pending.

22. The apparatus of claim 20 wherein the metric second value comprises the number of different destinations requested by the each source.

23. The apparatus of claim 20 wherein the metric second value comprises the number of unconnected requests generated by the each source.

24. The apparatus of claim 20 wherein the metric second value comprises the combination of the number of different destinations requested by the each source with the number of unconnected requests generated by the each source.

25. A computer program product for determining connections in a multipath switch between a plurality of sources and a plurality of destinations wherein each source generates one or more requests for connection to one of the plurality of destinations, the computer program product comprising a computer usable medium having computer readable program code thereon, including:
   program code that associates a source metric having a value dynamically computed from first predetermined criteria with each source;
   program code that associates a destination metric having a value dynamically computed from second predetermined criteria with each destination;
   program code that repeatedly connects a destination having the smallest metric value of all unconnected destinations to a source requesting that destination having the smallest metric value of all unconnected sources until all sources are connected to requested destinations.

26. The computer program product of claim 25 wherein the program code that generates the source metric value comprises program code that computes the metric value for a source to be equal to the number of different destinations requested by the source.

27. The computer program product of claim 25 wherein the program code that generates the destination metric value comprises program code that computes the metric value for a destination to be equal to the number of different sources requesting that destination.

28. The computer program product of claim 25 wherein the program code that generates the source metric value comprises program code that computes the metric value for a source to be equal to the number of unconnected requests generated by that source.

29. The computer program product of claim 25 wherein the program code that generates the destination metric value comprises program code that computes the metric value for a destination to be equal to the number of unconnected requests for that destination.

30. The computer program product of claim 25 wherein the program code that generates the source metric value comprises:
   program code that computes a request value equal to the number of different destinations requested by each source;
   program code that computes a request length value equal to the number of unconnected requests generated by each source; and
   program code that computes the metric value of each source as the combination of the request value with the queue length value.

31. The computer program product of claim 25 wherein the program code that generates the destination metric value comprises:
   program code that computes a request value equal to the number of different sources requesting each destination;
   program code that computes a queue length value equal to the number of unconnected requests for that destination; and
   program code that computes the metric value of each source as the combination of the request value with the queue length value.

32. The computer program product of claim 25 further comprising program code that assigns each request a metric having a first value that is dynamically computed from characteristics of the each request and a second value is dynamically computed from characteristics of the source generating the each request.

33. The computer program product of claim 32 wherein the metric first value comprises at least one of the group consisting of a user-assigned priority value and the length of time that the each request has been pending.

34. The computer program product of claim 32 wherein the metric second value comprises the number of different destinations requested by the each source.

35. The computer program product of claim 32 wherein the metric second value comprises the number of unconnected requests generated by the each source.

36. The computer program product of claim 32 wherein the metric second value comprises the concatenation of the number of different destinations requested by the each source with the number of unconnected requests generated by the each source.

37. A computer data signal embodied in a carrier wave for determining connections in a multipath switch between a plurality of sources and a plurality of destinations wherein each source generates one or more requests for connection to one of the plurality of destinations, the computer data signal comprising:
   program code that associates a source metric having a value dynamically computed from first predetermined criteria with each source;
   program code that associates a destination metric having a value dynamically computed from second predetermined criteria with each destination;
   program code that repeatedly connects a destination having the smallest metric value of all unconnected destinations to a source requesting that destination having the smallest metric value of all unconnected sources until all sources are connected to requested destinations.

38. Apparatus for determining connections in a multipath switch between a plurality of sources and a plurality of destinations wherein each source generates one or more requests for connection to one of the plurality of destinations, comprising:
   means for generating source metric information having a value dynamically computed from first predetermined criteria with each source;
   means for generating destination metric information having a value dynamically computed from second predetermined criteria with each destination; and
   means for repeatedly connecting a destination having the smallest destination metric value of all unconnected destinations to a source requesting that destination having the smallest source metric value of all unconnected sources until all sources are connected to requested destinations.

* * * * *